United States Patent
Yang

(10) Patent No.: US 12,484,810 B2
(45) Date of Patent: Dec. 2, 2025

(54) BODY FLUID ANALYTE DETECTION DEVICE

(71) Applicant: MEDTRUM TECHNOLOGIES INC., Shanghai (CN)

(72) Inventor: Cuijun Yang, Shanghai (CN)

(73) Assignee: MEDTRUM TECHNOLOGIES INC., Shanghai (CN)

( * ) Notice: Subject to any disclaimer, the term of this patent is extended or adjusted under 35 U.S.C. 154(b) by 649 days.

(21) Appl. No.: 17/800,538

(22) PCT Filed: Aug. 3, 2020

(86) PCT No.: PCT/CN2020/106518
§ 371 (c)(1),
(2) Date: Aug. 18, 2022

(87) PCT Pub. No.: WO2021/164206
PCT Pub. Date: Aug. 26, 2021

(65) Prior Publication Data
US 2023/0092945 A1   Mar. 23, 2023

(30) Foreign Application Priority Data
Feb. 20, 2020   (WO) ............... PCT/CN2020/075969

(51) Int. Cl.
*A61B 5/00* (2006.01)
*A61B 5/145* (2006.01)
(Continued)

(52) U.S. Cl.
CPC ........ *A61B 5/14532* (2013.01); *A61B 5/0002* (2013.01); *A61B 5/002* (2013.01);
(Continued)

(58) Field of Classification Search
None
See application file for complete search history.

(56) References Cited

U.S. PATENT DOCUMENTS

| 2012/0059231 A1* | 3/2012 | Frey | A61B 5/6833 604/151 |
| 2015/0238094 A1* | 8/2015 | Lai | A61B 5/0006 600/509 |

(Continued)

FOREIGN PATENT DOCUMENTS

| CN | 103750819 | 4/2014 |
| CN | 104887242 | 9/2015 |

(Continued)

OTHER PUBLICATIONS

"International Search Report (Form PCT/ISA/210) of PCT/CN2020/106518", mailed on Nov. 25, 2021, with English translation thereof, pp. 1-3.

*Primary Examiner* — Benjamin R Whatley
(74) *Attorney, Agent, or Firm* — JCIP GLOBAL INC.

(57) ABSTRACT

A body fluid analyte detection device, includes: a transmitter, provided with at least one first fastener part; a bottom case, provided with at least one second fastener part corresponding to the first fastener part, and the bottom case including at least one fixed portion and at least one force-receiving portion. When separating the bottom case and the transmitter, the fixed portion is fixed and a force is applied to the force-receiving portion in one direction, separating the bottom case and the transmitter. The body fluid analyte detection device further includes a sensor connected with the transmitter to transmit the parameter signal; and a battery assembled in the bottom case or in the transmitter. The part holding the battery is the battery portion. A force is applied to the force-receiving portion in only one direction to make the bottom case fail and thereby separating the transmitter and the bottom case, simplifying user action and enhancing user experience.

13 Claims, 4 Drawing Sheets

(51) Int. Cl.
*A61B 5/1468* (2006.01)
*A61B 5/1473* (2006.01)
*A61M 5/158* (2006.01)
*A61M 5/172* (2006.01)
*B01L 3/00* (2006.01)
*H01M 50/247* (2021.01)
*H01M 50/271* (2021.01)

(52) U.S. Cl.
CPC ........ *A61B 5/14503* (2013.01); *A61B 5/1451* (2013.01); *A61B 5/14546* (2013.01); *A61B 5/1468* (2013.01); *A61B 5/1473* (2013.01); *A61B 5/683* (2013.01); *A61B 5/6838* (2013.01); *A61B 5/6848* (2013.01); *A61B 5/6849* (2013.01); *A61M 5/158* (2013.01); *A61M 5/1723* (2013.01); *B01L 3/502715* (2013.01); *B01L 3/505* (2013.01); *B01L 3/508* (2013.01); *H01M 50/247* (2021.01); *H01M 50/271* (2021.01); *A61B 2560/0214* (2013.01); *A61B 2560/045* (2013.01); *A61B 2560/0462* (2013.01); *A61B 2560/0468* (2013.01); *A61B 2562/16* (2013.01); *A61B 2562/225* (2013.01); *A61B 2562/227* (2013.01); *A61M 2205/0216* (2013.01); *A61M 2205/0233* (2013.01); *B01L 2200/0689* (2013.01); *B01L 2300/023* (2013.01); *B01L 2300/0609* (2013.01); *B01L 2300/0645* (2013.01); *B01L 2300/0663* (2013.01); *B01L 2300/123* (2013.01); *B01L 2400/0677* (2013.01)

(56) References Cited

U.S. PATENT DOCUMENTS

2015/0243960 A1* 8/2015 Imanishi ............. H01M 50/578
429/61
2021/0386338 A1* 12/2021 Zhang .................... A61L 2/208

FOREIGN PATENT DOCUMENTS

| CN | 106470593 | 3/2017 |
| CN | 109998560 | 7/2019 |
| CN | 110584676 | 12/2019 |
| EP | 2332466 | 4/2014 |

* cited by examiner

BODY FLUID ANALYTE DETECTION DEVICE

CROSS-REFERENCE TO RELATED APPLICATION

This application is a 371 of international application of PCT application serial no. PCT/CN2020/106518, filed on Aug. 3, 2020, which claims the priority benefit of PCT application serial no. PCT/CN2020/075969, filed on Feb. 20, 2020. The entirety of each of the above-mentioned patent applications is hereby incorporated by reference herein and made a part of this specification.

TECHNICAL FIELD

The present invention mainly relates to the field of medical device, and in particular, to a body fluid analyte detection device.

BACKGROUND

The pancreas in a normal person can automatically monitor the amount of glucose in the blood and automatically secrete the required dosage of insulin/glucagon. However, for diabetic patients, the function of the pancreas is abnormal, and the pancreas cannot normally secrete required dosage of insulin. Therefore, diabetes is a metabolic disease caused by abnormal pancreatic function and also a lifelong disease. At present, medical technology cannot cure diabetes, but can only control the onset and development of diabetes and its complications by stabilizing blood glucose.

Patients with diabetes need to check their blood glucose before injecting insulin into the body. At present, most of the detection methods can continuously detect blood glucose, and send the blood glucose data to the remote device in real time for the user to view. This detection method is called Continuous Glucose Monitoring (CGM), which requires the detection device to be attached to the surface of the patients' skin, and the sensor carried by the device is inserted into the subcutaneous tissue fluid for testing.

When the life of the sensor of the detection device ends, the user needs to apply forces in different directions and go through multiple steps to separate the transmitter from the bottom case, which negatively affects the user experience.

Therefore, the prior art urgently needs a body fluid analyte detection device that is easy to use and has good user experience.

BRIEF SUMMARY OF THE INVENTION

The embodiment of the present invention discloses a body fluid analyte detection device. The bottom case fails when a force is applied to its force-receiving portion in only one direction, separating the first fastener part from the second fastener part, thereby reducing the number of steps required to separate the transmitter and the bottom case, and enhancing the user experience.

The invention discloses a body fluid analyte detection device, including: a transmitter, provided with at least one first fastener part; a bottom case, provided with at least one second fastener part corresponding to the first fastener part, and with the first fastener part and the second fastener part fastening with each other, the transmitter is assembled on the bottom case, and the bottom case comprises at least one fixed portion and at least one force-receiving portion, and when separating the bottom case and the transmitter, the fixed portion is fixed and a force is applied to the force-receiving portion in one direction leading to the bottom case failure, separating at least one pair of mutually fastened first fastener part and second fastener part, thus separating the bottom case and the transmitter; a sensor, assembled to the bottom case, is used to detect the analyte parameter of the body fluid, and the sensor is connected with the transmitter to transmit the parameter signal; and a battery, for powering the transmitter, is assembled in the bottom case or in the transmitter, and the part holding the battery is the battery portion.

According to one aspect of the invention, the part of the bottom case where the transmitter is fastened is the force-receiving portion.

According to one aspect of the present invention, the side of the bottom case is provided with a convex portion which is the force-receiving portion.

According to one aspect of the present invention, the battery is provided in the bottom case on which at least one connection hole is provided, and the transmitter is electrically connected to the two electrodes of the battery through the connection hole, and the battery portion is the force-receiving portion.

According to one aspect of the present invention, a sealing ring is provided around the connection hole to seal the electrical connection position, and when a force is applied to the force-receiving portion, the sealing ring provides an elastic force that facilitates separation of the bottom case and the transmitter.

According to one aspect of the present invention, a seal member is provided around the sensor to seal the connection position between the sensor and the transmitter, and when a force is applied to the force-receiving portion, the seal member provides an elastic force that facilitates separation of the bottom case and the transmitter.

According to one aspect of the present invention, the transmitter is provided with two first fastener parts, and the bottom case is correspondingly provided with two second fastener parts, and in the bottom case, the force-receiving portion and the fixed portion are respectively set on the two sides of the connection line $l_1$ between the two second fastener parts.

According to one aspect of the present invention, a crease groove is provided on the bottom case at a position corresponding to the connection line $l_1$.

According to one aspect of the present invention, the two second fastener parts are hooks and disposed on the side wall of the bottom case.

According to one aspect of the present invention, the convex portion is provided on the same side as the two second fastener parts and close to them.

According to one aspect of the present invention, the bottom case is provided with four second fastener parts, and the connection lines between the corresponding second fastener parts are $l_2$ and $l_3$, respectively, which divide the bottom case into three parts: the force-receiving portion, the fixed portion and the force-receiving portion, in which the two force-receiving portions are located on both sides of the bottom case while the fixed portion is located between the two force-receiving portions.

According to one aspect of the present invention, the battery is provided inside the transmitter, the bottom case is provided with an assembly hole which is used to assemble the battery portion, and part of the battery portion is exposed outside the bottom case, and the convex portion is located on one side of the assembly hole, and when a force is applied to the convex portion, the exposed part of the battery portion is used as a supporting portion.

According to one aspect of the present invention, the failure mode of the bottom case includes one or more combinations of the fracture of the bottom board or side wall of the bottom case, breakage of the bottom case, breakage of the second fastener part, or the plastic deformation of the bottom case.

According to one aspect of the present invention, the bottom board of the bottom case is provided with a window where a sensor unit is assembled, and part of the sensor is mounted on the sensor unit, and the edge contour shapes of the sensor unit and that of the window match each other, and the sensor can be assembled on the bottom case with the support of the sensor unit.

Compared with the prior art, the technical solution of the present invention has the following advantages:

In the body fluid analyte detection device disclosed by the present invention, at least one first fastener part is provided on the transmitter, and at least one second fastener part corresponding to the first fastener part is provided on the bottom case. The bottom case includes at least one fixed portion and at least one force-receiving portion. When separating the bottom case and the transmitter, the fixed portion is fixed and a force is applied to the force-receiving portion in one direction leading to the bottom case failure, separating at least one pair of mutually fastened first fastener part and second fastener part, thus separating the bottom case and the transmitter. Applying a force on the force-receiving portion in only one direction leads to the bottom case failure, thereby separating the first fastener part and the second fastener part from each other, which reduces the number of steps required to separate the transmitter and the bottom case, and enhances the user experience.

Furthermore, the side of the bottom case is provided with a convex portion which is the force-receiving portion. Setting the point of action of the applied force on the convex potion makes it easier for the bottom case to fail, and resultingly easier for the transmitter and bottom case to separate from each other.

Furthermore, the battery is provided in the bottom case on which at least one connection hole is provided, and the transmitter is electrically connected to the two electrodes of the battery through the connection hole, and the battery portion is the force-receiving portion. The battery portion is a part of the bottom case and serves as a force-receiving portion. With the battery portion, the transmitter and the bottom case can be easily separated without any additional convex portion, which reduces the size of the detection device. Secondly, since the battery portion is thicker and larger than an average convex portion, using it as the force-receiving portion allows the user to implement a force more easily, which simplifies user actions.

Furthermore, a sealing ring is provided around the connection hole to seal the electrical connection position, and when a force is applied to the force-receiving portion, the sealing ring provides an elastic force that facilitates the separation of the bottom case and the transmitter. The sealing ring not only plays a role in sealing the position of the electrical connection, but also provides a compression elastic force to facilitate the separation of the transmitter and the bottom case.

Furthermore, a seal member is provided around the sensor to seal the connection position of the sensor and the transmitter, and when a force is applied to the force-receiving portion, the seal member provides an elastic force that facilitates separation of the bottom case and the transmitter.

The seal member not only serves to seal the connection position between the transmitter and the sensor, but also provides a compression elastic force to facilitate the separation of the transmitter and the bottom case.

Furthermore, two second fastener parts are provided on the bottom case, and a crease groove is provided on the bottom case at a position corresponding to the connection line $l_1$ between the two fastener parts. The crease groove can reduce the thickness of the bottom case where it is located. When a force is exerted to the force-receiving portion, the bottom case is more likely to fail along the crease groove, making the separation much easier.

Furthermore, the convex portion is provided on the same side as the two second fastener parts and close to them. The position of the convex portion is close to the positions of the two second fastener parts, therefore, the bottom case can fail under a smaller force to the convex portion, making the separation easier for the user.

Furthermore, the bottom case is provided with four second fastener parts, and the connection lines between the corresponding second fastener parts are $l_2$ and $l_3$, respectively, which divide the bottom case into three parts: the force-receiving portion, the fixed portion and the force-receiving portion, in which the two force-receiving portions are located on both sides of the bottom case while the fixed portion is located between the two force-receiving portions. For the two force-receiving portions are located on both sides of the detection device, the user can simultaneously apply forces to the force-receiving portions on both sides of the detection device with fingers, making the bottom case fail easily.

Furthermore, the battery is provided inside the transmitter, the bottom case is provided with an assembly hole which is used to assemble the battery portion, and part of the battery portion is exposed outside the bottom case, and the convex portion is located on one side of the assembly hole, and when a force is applied to the convex portion, the exposed part of the battery portion is used as a supporting portion of the force applied. The exposed part of the battery portion can be used as a supporting portion of the thumb, which means that it is equivalent to applying an another force on the transmitter in the opposite direction to the force applied on the force-receiving portion, therefore, the user will separate the transmitter from the bottom case more easily.

DETAILED DESCRIPTION

Figure 1:
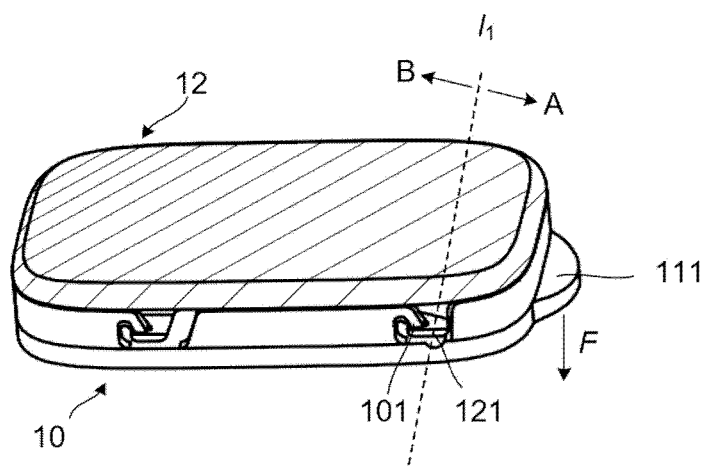
FIG. 1 is a schematic diagram of a body fluid analyte detection device according to an embodiment of the present invention.

As mentioned above, when separating the transmitter and the bottom case of the detection device in the prior art, the user needs to apply forces in different directions, and multiple steps are required to separate the transmitter from the bottom case, which negatively affects the user experience.

After research, it is found that the reason for the above-mentioned problems is that manufacturers have set up many complicated fastening structures in order not to damage the bottom case, resulting in multiple steps required for separation.

In order to solve this problem, the present invention provides a body fluid analyte detection device with a bottom case that can fail when forces are applied to the force-receiving portion in only one direction, resulting in the separation of the first fastener part and the second fastener part, which reduces the number of steps required to separate the transmitter and the bottom case, and enhances the user experience.

Various exemplary embodiments of the present invention will now be described in detail with reference to the drawings. The relative arrangement of the components and the steps, numerical expressions and numerical values set forth in the embodiments are not to be construed as limiting the scope of the invention.

In addition, it should be understood that, for ease of description, the dimensions of the various components shown in the figures are not necessarily drawn in the actual scale relationship, for example, the thickness, the width, the length or the distance of certain units may be exaggerated relative to other structures.

The following description of the exemplary embodiments is merely illustrative, and is not intended to be in any way limiting the invention and its application or use. The techniques, methods and devices that are known to those of ordinary skill in the art may not be discussed in detail, but such techniques, methods and devices should be considered as part of the specification.

It should be noted that similar reference numerals and letters indicate similar items in the following figures. Therefore, once an item is defined or illustrated in a drawing, it will not be discussed further in following description of the drawings.

The First Embodiment

FIG. 1 is a schematic diagram of a body fluid analyte detection device according to an embodiment of the present invention.

The detection device includes a bottom case 10, a sensor 113, and a transmitter 12.

The bottom case 10, which is used to assemble the transmitter 12 and the sensor 113, and to paste the detection device on the skin surface, includes at least one fixed portion and at least one force-receiving portion. At least one second fastener part 101 is provided on the bottom case 10. The second fastener part 101 is used to fasten the transmitter 12. Preferably, in the embodiment of the present invention, the number of the second fastener part 101 is two. The two second fastener parts 101 are correspondingly provided on the side wall of the bottom case 10.

Here, the fixed portion and the force-receiving portion are relative concepts. According to the structural design of the bottom case 10 and the transmitter 12, there can be different options for the positions of the fixed portion and the force-receiving portion, which will be described in detail below.

The sensor, assembled on the bottom case 10, is used to detect the analyte parameter information of the body fluid.

The transmitter 12 is used to receive the detection signal generated by the sensor and wirelessly transmit the signal to a remote device. Therefore, the transmitter 12 is connected to the sensor.

The transmitter 12 is provided with at least one first fastener part 121 which corresponds to the second fastener part 101. With the second fastener part 101 and the first fastener part 121 fastened with each other, the transmitter 12 is assembled on the bottom case 10. Obviously, in the embodiment of the present invention, the transmitter 12 is provided with two first fastener parts 121, that is, two pairs of the first fastener part 121 and the second fastener part 101 are fastened with each other.

Here, the correspondence between the first fastener part 121 and the second fastener part 101 means that the numbers of the two are equal and their positions are corresponding.

When the bottom case 10 and the transmitter 12 are being separated, the fixed portion is fixed by a finger or other structures while the force-receiving portion receives a force in only one direction from another finger or other auxiliary structures, the bottom case 10 fails, and the second fastener part 101 and the first fastener part 121 are separated from each other, thereby separating the transmitter 12 from the bottom case 10. That means only one finger is used to apply a force in only direction to the force-receiving portion when user separates the transmitter 12 from the bottom case 10, reducing the number of the steps required.

It should be noted here that failure is a conventional concept in the field of engineering materials. After failure, the material loses its original function and the failed part cannot be recovered again. Since the second fastener part 101 is a part of the bottom case 10, the failure of the bottom case 10 includes the failure of its bottom board or the side wall, or the second fastener part 101. Therefore, the failure modes of the bottom case 10 include one or more combinations of the fracture of the bottom board or side wall of the bottom case 10 (as shown in FIG. 3b), breakage of the bottom case 10, breakage of the second fastener part 101 (as shown in FIG. 3d), or the plastic deformation of the bottom case 10. Obviously, after the bottom case 10 fails, the bottom case 10 loses the function of fastening the transmitter 12.

The method of fixing the fixed portion includes clamping, supporting, etc., and is not specifically limited herein, as long as the condition for fixing the fixed portion can be satisfied.

Preferably, in the embodiment of the present invention, the connection line $l_1$ between the two second fastener parts 101 divides the bottom case 10 into side A and side B. The force-receiving portion is provided on side A while the fixed portion is on side B. Since the outer contour of the transmitter 12 and that of the bottom case 10 almost coincide, in the embodiment of the present invention, the side of the bottom case 10 is provided with a convex portion 111 to facilitate the force application. The convex portion 111 is the force-receiving portion.

The convex portion 111 is provided on the short side of the bottom case 10 while the two second fastener parts 101 are correspondingly provided on the long side of the bottom case 10. The two second fastener parts 101 and the two first fastener parts 121 are all hooks. When the transmitter 12 and the bottom case 10 are being separated, the convex portion 111, in the embodiment of the present invention, is disposed on the same side as the two second fastener parts 101 and close to them, as shown in FIG. 1. For the convex portion 111 is relatively close to the two second fastener parts 101, only a small force, applied to the convex portion 111, can make the second fastener part 101 fail, which facilitates the separation.

Therefore, in the embodiment of the present invention, the process of separating the bottom case 10 and the transmitter 12 is as follows. Fix the fixed portion on side B with a finger, and apply a force F to the convex portion 111 in one direction with another finger, making the second fastener part 101 fail, and separating the second fastener part 101 and the first fastener part 121, thus, separating the transmitter 12 from the bottom case 10.

It should be noted that the embodiments of the present invention do not limit the positions of the convex portion 111 and the second fastener part 101. For example, the convex portion 111 may be disposed on the long side of the bottom case 10 while the two second fastener parts 101 are correspondingly on the short side. Alternatively, the distance between the convex portion 111 and the second fastener part 101 is much longer, so a larger force is required to be applied to the convex portion 111 to make the second fastener part 101 fail and separate it from the first fastener part 121. Or the second fastener part 101 may also be provided on the bottom board of the bottom case 10, which is not specifically limited herein.

In the embodiment of the present invention, the shape of the top view of the detection device is a rounded rectangle. The embodiment of the present invention does not specifically limit the shape of the top view of the detection device, and the shape may also be a rectangle, a circle, an ellipse, or other shapes.

Figure 2:
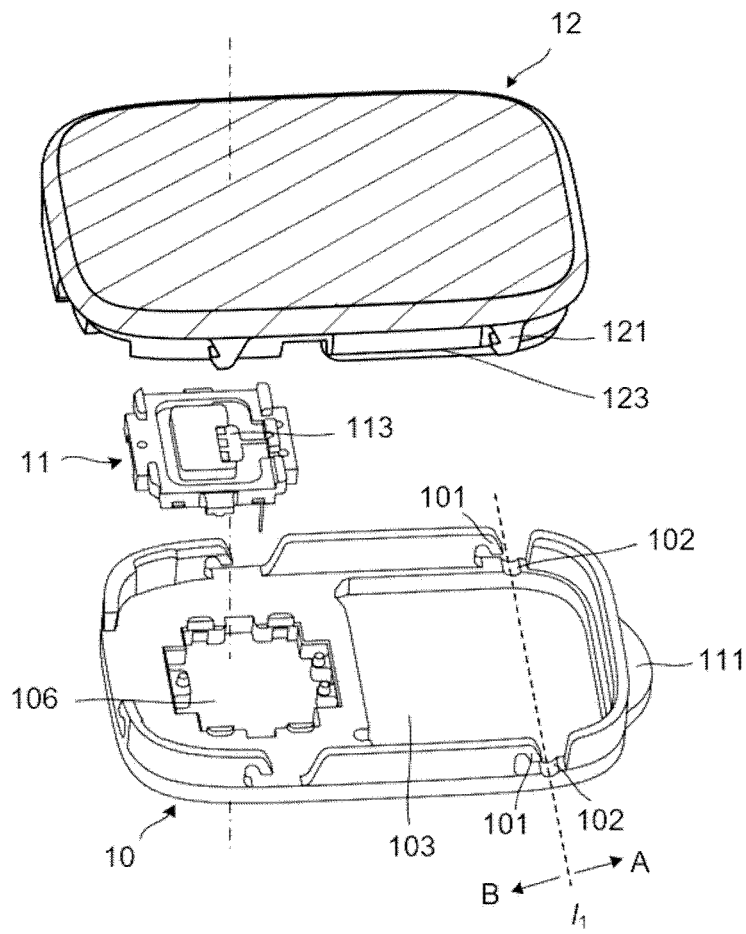
FIG. 2 is a schematic diagram of an assembly structure of a transmitter and a bottom case according to an embodiment of the present invention.

FIG. 2 is a schematic diagram of the assembly structure of the transmitter 12 and the bottom case 10 according to the embodiment of the invention.

The detection device also includes a battery (not shown) which is used to power the transmitter. The location where the battery is provided is the battery portion 123. Preferably, in the embodiment of the present invention, the battery is provided in the transmitter 12, which means that the transmitter 12 can be charged multiple times for reusing, reducing the cost.

Since the battery has a certain size, the bottom case 10 of the embodiment of the present invention is further provided with an assembly hole 103 for assembling the battery portion 123. Preferably, in the embodiment of the present invention, after the battery portion 123 is assembled to the assembly hole 103, part of the battery portion 123 is exposed outside the bottom case 10. And the convex portion 111 is provided on one side of the assembly hole 103. Therefore, when a force F is applied to the convex portion 111 to separate the bottom case 10 and the transmitter 12, the exposed part of the battery portion 123 can be used as a supporting portion of the force F applied (e.g., the thumb is supported by the exposed part of the battery portion 123). At this time, the user's thumb applies a force to the transmitter 12 in the opposite direction to the force F applied to the force-receiving portion, facilitating the separation of the bottom case 10 and the transmitter 12.

It should be noted that in other embodiments of the present invention, the assembly hole 103 may not be provided, that is, the battery portion 123, which is not exposed to the outside, is completely wrapped by the bottom case 10.

In the embodiment of the present invention, a crease groove 102 is further provided on the bottom case 10 at a position corresponding to the connection line $l_1$. Since the crease groove 102 can reduce the thickness of the bottom case where it is located, the bottom case 10 is more likely to fail along the crease groove 102, making the separation easier. Due to the existence of the assembly hole 103, the crease groove 102 is located on the side wall of the bottom case 10. Obviously, when the assembly hole 103 is not provided, the crease groove 102 may extend across the bottom board of the bottom case 10 along the connection line $l_1$.

Preferably, in the embodiment of the present invention, the bottom board of the bottom case 10 is further provided with a window 106 where a sensor unit 11 is assembled. The edge contour shape of the sensor unit 11 matches that of the window 106. Here, the match of the edge contour shapes of the two means that the edges of the two can be embedded into each other.

Part of the sensor 113 is provided on the sensor unit 11 while the other part is subcutaneously. The sensor 113 can be assembled on the bottom case 10 with the support of the sensor unit 11. Preferably, in the embodiment of the present invention, the sensor 113, assembled on the sensor unit 11, does not change its shape before and after assembly, that is, the sensor 113 and the sensor unit 11 are assembled on the bottom case 10 together. Therefore, after the sensor 113 is assembled, the sensor unit 11 becomes part of the bottom case 10.

Figure 3A:
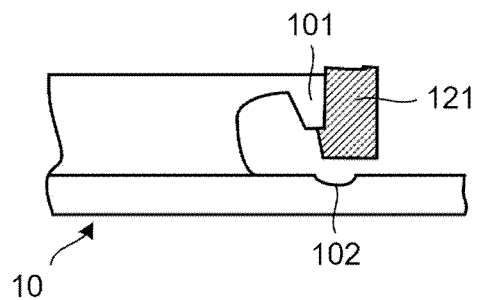
FIG. 3a-FIG. 3b are schematic diagrams of the bottom board or the side wall of the bottom case before and after the failure according to an embodiment of the present invention.
Figure 3B:
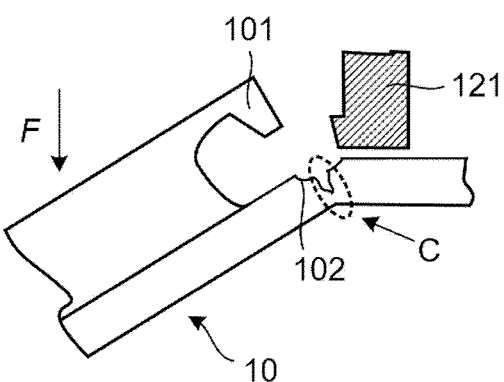
Figure 3C:
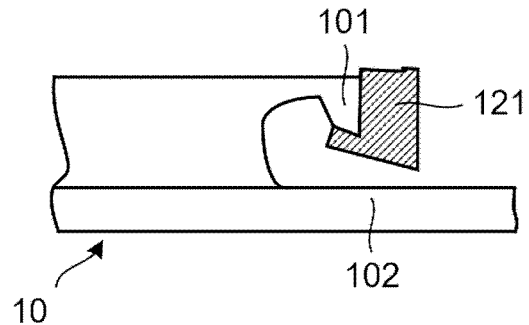
FIG. 3c-FIG. 3d are schematic diagrams of the second fastener part on the bottom case before and after the failure according to an embodiment of the present invention.
Figure 3D:
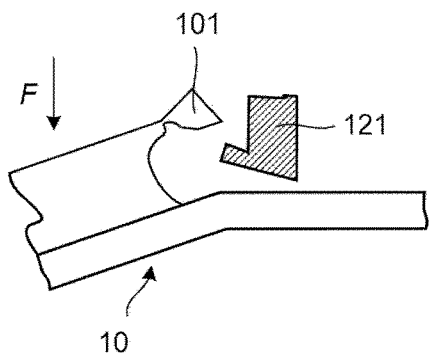

FIG. 3a-FIG. 3b are schematic diagrams of the bottom board or the side wall of the bottom case 10, before and after the failure. FIG. 3c-FIG. 3d are schematic diagrams of the second fastener part 101 before and after the failure.

As described above, the first fastener part 121 and the second fastener part 101 are all hooks. When the force F is applied to the force-receiving portion in one direction, the bottom case 10 is fractured along the crease groove 102 as depicted by the dotted circle C. In FIG. 3c-FIG. 3d, when the force F is applied to the force-receiving portion in one direction, the second fastener part 101 is fractured.

In other embodiments of the present invention, the first fastener part 121 and the second fastener part 101 may be a locking hole and a locking block, or a locking block and a locking slot, respectively, which is not specifically limited herein.

The Second Embodiment

The second embodiment differs from the first embodiment in that the battery is disposed in the bottom case and there is no assembly hole. Other structures and connection methods are similar to the first embodiment.

Figure 4:
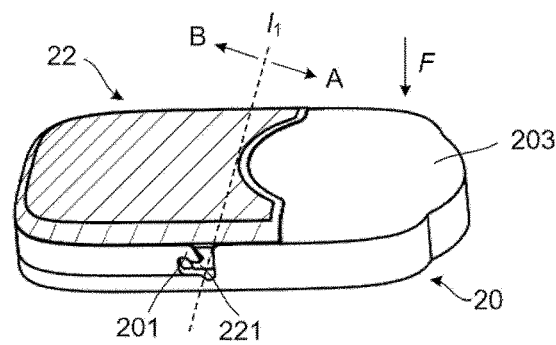
FIG. 4 is a schematic diagram of a detection device according to another embodiment of the present invention.

FIG. 4 is a schematic diagram of a detection device according to an embodiment of the invention.

In the embodiment of the present invention, the battery is disposed in the bottom case 20. Therefore, the battery portion 203 is disposed on the bottom case 20. The top of the battery portion 203 is flush with that of the transmitter 22, so that the thickness of the detection device can be reduced. At this time, the bottom case 20 is not provided with a convex portion, but the battery portion 203 directly serves as the force-receiving portion. Since the battery portion 203, as a force-receiving portion, is thicker and has a larger area compared with an average convex portion, the user can apply the force F to the battery portion more easily, which optimizes user experience.

Similarly, the two second fastener parts 201 are provided on both side walls of the bottom case 20. The connection line $l_1$ between the two second fastener parts 201 divides the bottom case into side A and side B. The battery portion 203 is provided on side A and serves as a force-receiving portion while side B serves as a fixed portion. When the bottom case 20 and the transmitter 22 are being separated, the fixed portion is fixed while a force F is applied to the battery portion 203 in one direction, making the bottom case 20 fail, thus separating the transmitter 22 from the bottom case 20.

Figure 5A:
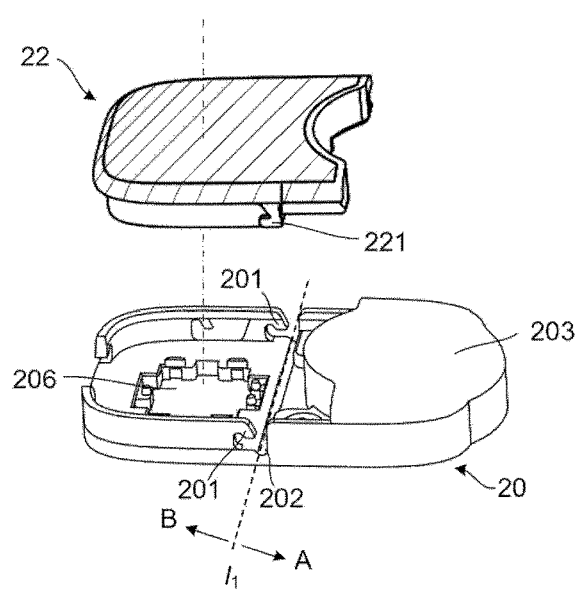
FIG. 5a is a schematic diagram of an assembly structure of the transmitter and the bottom case according to another embodiment of the present invention.
Figure 5B:
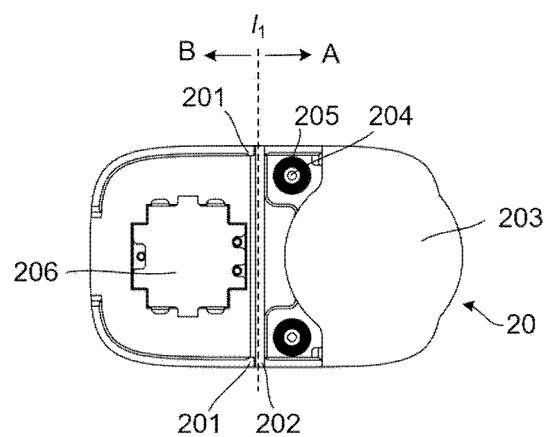
FIG. 5b is a top view of the bottom case according to another embodiment of the present invention.

FIG. 5*a* is a schematic diagram of the assembly structure of the transmitter 22 and the bottom case 20 according to the embodiment of the present invention. FIG. 5*b* is a top view of the bottom case 20 according to the embodiment of the present invention.

As shown in FIG. 5*a* and FIG. 5*b,* the crease groove 202 corresponding to the connection line $l_1$ extends across the bottom board of the bottom case 20. When the first fastener part 221 is separated from the second fastener part 201, the bottom case 20 is fractured along the crease groove 202.

Since the battery needs to supply power to the transmitter 22, the bottom case 20 is further provided with at least one connection hole 204, through which the transmitter 22 is electrically connected to the two electrodes of the battery, respectively.

Electrical contact pins, electrically connected to the transmitter 22, may be provided in the connection hole 204. Or the transmitter 22 is provided with a protruding electrical connection end that can be inserted into the connection hole 204 for electrical connection. Alternatively, the battery and the transmitter 22 are electrically connected by a wire passing through the connection hole 204 or by a wire coated on the surface of the bottom case 20.

It should be noted that in other embodiments of the present invention, the connection hole 204 may not be provided, while the transmitter 22 and the two electrodes of the battery are electrically connected by wires completely coated on the surface of the bottom case 20, which is not specifically limited herein.

Preferably, in the embodiment of the present invention, in order to seal the electrical connection position, a sealing ring 205 is provided around the connection hole 204.

Generally, the elastic sealing material can perform sealing function after being pressed. In the embodiment of the present invention, the squeezed sealing ring 205 exerts a certain elastic force on the transmitter 22. When a force F is applied to the force-receiving portion, the sealing ring 205 provides an elastic force that facilitates the separation of the transmitter 22 from the bottom case 20.

Preferably, in the embodiment of the present invention, in order to seal the connection position of the transmitter 22 and the sensor, a seal member (not shown) is provided around the sensor. Similar to the sealing ring 205 described above, when the force F is applied to the force-receiving portion, the seal member also provides an elastic force that facilitates the separation of the transmitter 22 from the bottom case 20.

It should be noted that, since the sealing performance of the electrical connection position between the transmitter 22 and the battery or the connection position between the transmitter 22 and the sensor is relatively good, other embodiments of the present invention may not provide the sealing ring 205 or the seal member.

For the failure modes of the bottom case 20, the function of the window 206, the types and the fastening modes of the first fastened part 221 and the second fastened part 201, please refer to the foregoing description, which will not be repeated herein.

In other embodiments of the present invention, the portion of the bottom case 20 where the transmitter 22 is assembled may also be a force-receiving portion, which is not specifically limited herein. It should be pointed out here that although the force F may be directly applied on the transmitter 22, the actual effect of the force F is only displayed on the bottom case 20, that is, the force F only changes the condition of the bottom case 20 (such as changes in shape and structure etc.), not that of the transmitter 22, and at this time, it can be regarded that the force is applied on the force-receiving portion of the bottom case 20 by the user.

The Third Embodiment

Compared with the previously described embodiments, the third embodiment is different in that only one first fastener part is provided on the transmitter, and only one second fastener part is correspondingly provided on the bottom case, and the top view shape of the detection device is an ellipse.

Figure 6:
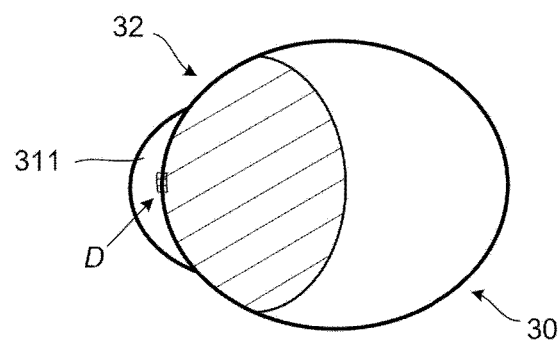
FIG. 6 is a schematic diagram of a detection device including only one first fastener part and one second fastener part according to yet another embodiment of the present invention.

FIG. 6 is a schematic diagram of a detection device according to an embodiment of the present invention including only one first fastener part and one second fastener part, respectively.

One first fastener part and one second fastener part are fastened with each other at position D, that is, only one pair of the first fastener part and the second fastener part are fastened with each other. The bottom case 30 includes a convex portion 311 which is the force-receiving portion, and the rest part of the bottom case 30 is the fixed portion. Receiving a force on the convex portion 311, the bottom case 30 fails, so that the first fastener part and the second fastener part are separated from each other, thereby separating the transmitter 32 and the bottom case 30.

For the failure modes of the bottom case 30, the types and the fastening modes of the first fastener part and the second fastener part, please refer to the foregoing description, which will not be repeated herein.

The Fourth Embodiment

Compared with the aforementioned embodiments, the fourth embodiment is different in that the detection device includes a plurality of force-receiving portions.

Figure 7:
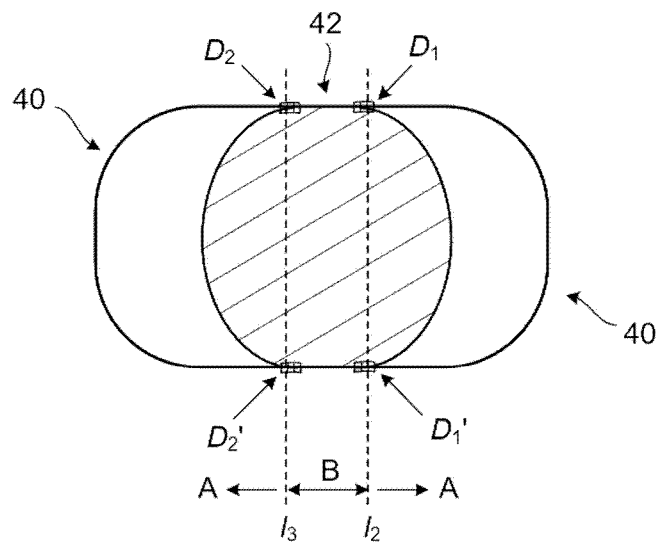
FIG. 7 is a top view of one detection device including two force-receiving portions according to yet another embodiment of the present invention.

FIG. 7 is a top view of a detection device including two force-receiving portions in one detection device according to an embodiment of the present invention.

In the embodiment of the present invention, the transmitter 42 is provided with four first fastener parts while the bottom case 40 is correspondingly provided with four second fastener parts. The corresponding first fastener parts and second fastener parts are fastened with each other at $D_1$-$D_1'$ and $D_2$-$D_2'$, that is, there are four pairs of mutually fastened first fastener parts and second fastener parts. On the bottom case 40, the connection lines of $D_1$-$D_1'$ and $D_2$-$D_2'$ are $l_2$ and $l_3$, respectively. Side A and side B of $l_2$ and $l_3$ are provided with the force-receiving portion and the fixed portion, respectively. Therefore, $l_2$ and $l_3$ divide the bottom case 40 into three parts: the force-receiving portion, the fixed portion and the force-receiving portion. In the embodiment of the present invention, two force-receiving portions are provided on both sides of the bottom case 40, and the one fixed portion is disposed between the two force-receiving portions.

When the transmitter 42 and the bottom case 40 are being separated, two thumbs are supported under the fixed portion to fix it while the two index fingers respectively apply a force to the force-receiving portion in one direction on both sides of the detection device, making the bottom case 40 fail easily.

For the failure modes of the bottom case 40, the types and the fastening modes of the first fastener part and the second fastener part, please refer to the foregoing description, which will not be repeated here.

It should be noted that, in other embodiments of the present invention, more first fastener parts and second fastener parts may be provided. Among them, the failure of at least one pair of the first fastener part and the second fastener part (similar to the manner shown in FIG. 6), or the failure of the two corresponding pairs of the first fastener parts and the second fastener parts (similar to the manner shown in FIG. 2 and FIG. 5a), or the failure of multiple pairs of corresponding first fastener parts and second fastener parts (similar to the method shown in FIG. 7) can all separate the bottom case and the transmitter.

In summary, the present invention discloses a body fluid analyte detection device. The bottom case includes at least one fixed portion and at least one force-receiving portion. The force is applied to the force-receiving portion in only one direction to make the bottom case fail and thereby separate the transmitter and the bottom case, simplifying user action and enhancing user experience.

While the invention has been described in detail with reference to the specific embodiments of the present invention, it should be understood that it will be appreciated by those skilled in the art that the above embodiments may be modified without departing from the scope and spirit of the invention. The scope of the invention is defined by the appended claims.

The invention claimed is:

1. A body fluid analyte detection device, comprising:
    a transmitter, provided with at least one first fastener part;
    a bottom case, provided with at least one second fastener part corresponding to the at least one first fastener part, and with the at least one first fastener part and the at least one second fastener part fastening with each other, wherein the transmitter is assembled on the bottom case, and the bottom case comprises at least one fixed portion and at least one force-receiving portion, and when separating the bottom case and the transmitter, the at least one fixed portion is fixed and a force is applied to the at least one force-receiving portion in one direction leading to the bottom case failure, separating at least one pair of the at least one first fastener part and the at least one second fastener part mutually fastened with each other, thus separating the bottom case and the transmitter;
    a sensor, assembled to the bottom case, wherein the sensor is used to detect an analyte parameter of a body fluid, and the sensor is connected to the transmitter to transmit a parameter signal; and
    a battery, for powering the transmitter, wherein the battery is assembled in the bottom case or in the transmitter, and a part holding the battery is a battery portion,
    wherein a bottom board of the bottom case is provided with a window where a sensor unit is assembled, and a part of the sensor is mounted on the sensor unit, and an edge contour shape of the sensor unit and an edge contour shape of the window match each other, an edge of the sensor unit and an edge of the window are embedded into each other and fit together so as to fix the sensor unit to the bottom board, and the sensor is assembled on the bottom case with support of the sensor unit,
    wherein the sensor unit comprises a main portion and a protrusion protruding from the main portion, the sensor is disposed at the main portion, the window comprises a main hole and a concave portion communicated with the main hole, the main portion is located in the main hole, the protrusion is engaged with the concave portion, and the sensor unit is detachably engaged with the bottom case.

2. The body fluid analyte detection device of claim 1, wherein
    a part of the bottom case where the transmitter is fastened is the force-receiving portion.

3. The body fluid analyte detection device of claim 1, wherein
    a side of the bottom case is provided with a convex portion which is the force-receiving portion.

4. The body fluid analyte detection device of claim 1, wherein
    the battery is provided in the bottom case on which at least one connection hole is provided, and the transmitter is electrically connected to two electrodes of the battery through the connection hole, and the battery portion is the force-receiving portion.

5. The body fluid analyte detection device of claim 4, wherein
    a sealing ring is provided around the connection hole to seal in an electrical connection position, and when a force is applied to the force-receiving portion, the sealing ring provides an elastic force that facilitates separation of the bottom case and the transmitter.

6. The body fluid analyte detection device of claim 1, wherein
    a seal member is provided around the sensor to seal in a connection position between the sensor and the transmitter, and when a force is applied to the force-receiving portion, the seal member provides an elastic force that facilitates separation of the bottom case and the transmitter.

7. The body fluid analyte detection device of claim 3, wherein
    the transmitter is provided with two first fastener parts, and the bottom case is correspondingly provided with two second fastener parts, and in the bottom case, the force-receiving portion and the fixed portion are respectively set on two sides of a connection line $l_1$ between the two second fastener parts.

8. The body fluid analyte detection device of claim 7, wherein
    a crease groove is provided on the bottom case at a position corresponding to the connection line $l_1$.

9. The body fluid analyte detection device of claim 7, wherein
    the two second fastener parts are hooks and disposed on a side wall of the bottom case.

10. The body fluid analyte detection device of claim 7, wherein
    the convex portion is provided on a same side as the two second fastener parts and close to the two second fastener parts.

11. The body fluid analyte detection device of claim 1, wherein
the at least one force-receiving portion comprises two force-receiving portions, the bottom case is provided with four second fastener parts, and connection lines between corresponding second fastener parts of the four second fastener parts are $l_2$ and $l_3$, respectively, which divide the bottom case into three parts: one of the force-receiving portions, the fixed portion and an other of the force-receiving portions, in which the two force-receiving portions are located on both sides of the bottom case while the fixed portion is located between the two force-receiving portions.

12. The body fluid analyte detection device of claim 3, wherein
the battery is provided inside the transmitter, the bottom case is provided with an assembly hole which is used to assemble the battery portion, and a part of the battery portion is exposed outside the bottom case, and the convex portion is located on one side of the assembly hole, and when a force is applied to the convex portion, the part of the battery portion is used as a supporting portion.

13. The body fluid analyte detection device of claim 1, wherein
a failure mode of the bottom case comprises one or more combinations of fracture of a bottom board or a side wall of the bottom case, breakage of the bottom case, breakage of the second fastener part, or plastic deformation of the bottom case.

* * * * *